(12) United States Patent
Guggenmos et al.

(10) Patent No.: US 8,006,951 B2
(45) Date of Patent: Aug. 30, 2011

(54) SOLENOID VALVE FOR HYDRAULIC BRAKE SYSTEMS WITH PRESSURE-ASSISTED CLOSING OF THE VALVE

(75) Inventors: Harald Guggenmos, Immenstadt (DE); Martin Kirschner, Blaichach (DE); Robert Mueller, Blaichach (DE); Peter Ullmann, Burgberg (DE)

(73) Assignee: Robert Bosch GmbH, Stuttgart (DE)

( * ) Notice: Subject to any disclaimer, the term of this patent is extended or adjusted under 35 U.S.C. 154(b) by 685 days.

(21) Appl. No.: 12/029,786

(22) Filed: Feb. 12, 2008

(65) Prior Publication Data

US 2008/0197308 A1    Aug. 21, 2008

(30) Foreign Application Priority Data

Feb. 16, 2007   (DE) .................... 10 2007 007 784

(51) Int. Cl.
*F16K 31/06*    (2006.01)
(52) U.S. Cl. ............. 251/129.02; 251/337; 303/119.2
(58) Field of Classification Search ............. 251/129.02, 251/129.15, 337; 303/119.2
See application file for complete search history.

(56) References Cited

U.S. PATENT DOCUMENTS

| | | | | |
|---|---|---|---|---|
| 4,251,052 A * | 2/1981 | Hertfelder et al. | ....... | 251/129.02 |
| 4,291,860 A * | 9/1981 | Bauer | ....... | 251/129.02 |
| 5,401,087 A * | 3/1995 | Goossens | ....... | 303/119.2 |
| 5,603,483 A * | 2/1997 | Reuter et al. | ....... | 251/129.02 |
| 5,803,556 A * | 9/1998 | Weis et al. | ....... | 303/119.2 |
| 5,975,654 A * | 11/1999 | Zaviska et al. | ....... | 303/119.2 |
| 6,019,441 A * | 2/2000 | Lloyd et al. | ....... | 303/156 |
| 6,659,421 B1 * | 12/2003 | Goossens | ....... | 251/129.02 |
| 6,742,764 B1 * | 6/2004 | Volz | ....... | 251/129.02 |
| 6,846,049 B2 * | 1/2005 | Obersteiner et al. | ....... | 303/119.2 |
| 2005/0006611 A1 * | 1/2005 | Choi et al. | ....... | 251/65 |

* cited by examiner

*Primary Examiner* — John Bastianelli
(74) *Attorney, Agent, or Firm* — Ronald E. Greigg

(57) ABSTRACT

Disclosed is a solenoid valve having a magnet unit and a valve cartridge having a capsule, an armature guided longitudinally in the capsule and connected to a sealing pin guided longitudinally inside a valve insert, and a valve body with a sealing seat; a magnetic force generated by the magnet unit moves the armature together with the sealing pin from an initial position toward the valve body counter to the force of a return spring, causing the sealing pin to move into and close the sealing seat in an end position, where the initial position represents a maximum volumetric flow between a valve inlet and a valve outlet. A spring support is embodied and situated so that the return spring is supported outside the volumetric flow and presses the armature into the initial position against the capsule, and the inlet and outlet are embodied and situated so that the direction of the volumetric flow assists the closing motion of the armature with the sealing pin.

20 Claims, 4 Drawing Sheets

SOLENOID VALVE FOR HYDRAULIC BRAKE SYSTEMS WITH PRESSURE-ASSISTED CLOSING OF THE VALVE

REFERENCE TO FOREIGN PATENT APPLICATION

This application is based on German Patent Application No. 10 2007 007 784.1 filed 16 Feb. 2007, upon which priority is claimed.

BACKGROUND OF THE INVENTION

1. Field of the Invention

The invention relates to a solenoid valve useful, for example, in hydraulic brake systems.

2. Description of the Prior Art

In brake systems, conventional solenoid valves that are open when without current serve the function, when the brakes are in the non-actuated state, of permitting small quantities of fluid to pass through in the event of a pressure increase generated either by driver command or by a precharged fluid reservoir and, when the brakes are in the actuated state, perform the function of closing off and maintaining the pressure after a pressure increase on the actuator is completed. For large production numbers, seat valves are generally used, which can be manufactured inexpensively.

FIG. 1 shows a known solenoid valve 1 with an integrated check valve 10, for example, in particular for a hydraulic unit that is used, for example, in an antilock brake system (ABS), a traction control system (TCS), or an electronic stability program system (ESP). As is clear from FIG. 1, the conventional solenoid valve 1 has a magnet unit 2 for generating a magnetic flux that includes a housing casing 2.1 and an electric coil that is composed of a coil winding 2.3 wound onto a winding support 2.2 and can be controlled via electrical connections, and a valve cartridge 3 that includes a capsule 4, a valve insert 5, a return spring 8, and an armature 6, which is connected to a scaling pin 7 that has a sealing region 7.1 and is guided in a longitudinally mobile fashion inside the valve insert 5. The magnet unit 2 generates a magnetic force that moves the longitudinally mobile armature 6 with the sealing pin 7 toward the valve insert 5 counter to the force of the return spring 8. A magnetic flux, which is generated by the magnet unit 2 through the supply of current to the coil winding 2.3 and introduced via a cover disk, is conveyed by the valve insert 5 axially toward the armature 6 via an air gap; the supply of current to the coil winding 2.3 via the electrical connections is executed by an end stage, not shown, that is situated outside the solenoid valve 1. The valve insert 5 also accommodates a valve body 9 with a relatively small through bore that includes a valve seat 9.1 into which the sealing region 7.1, which is embodied as a sealing dome, is inserted in a sealing fashion in order to perform the sealing function of the solenoid valve 1 and to adjust a volumetric flow between the valve inlet 11 and the valve outlet 12. Consequently, once actuated, i.e. after current has been supplied to the magnet coil, a magnetic circuit is produced, which generates a closing force that acts on the armature 6 and presses the sealing region 7.1 of the sealing pin 7 into the sealing seat 9.1 of the valve body 9.

OBJECT AND SUMMARY OF THE INVENTION

The solenoid valve according to the present invention has the advantage over the prior art that a spring support is provided that is embodied and situated so that a return spring is situated outside the volumetric flow and presses an armature in an initial position against a capsule; the initial position represents a maximum volumetric flow between a valve inlet and a valve outlet. The valve inlet and valve outlet are embodied and situated so that the direction of the volumetric flow promotes a closing motion of the armature, which a magnetic force generated by a magnet unit moves from the initial position toward a valve body in opposition to the force of the return spring, causing a sealing pin that has a sealing region and is connected to the armature to move into a sealing seat of a valve body and completely close the sealing seat in an end position. The geometric arrangement of the return spring outside the volumetric flow advantageously prevents the return spring from negatively influencing the fluid flow. In addition, these geometric arrangements of the return spring and the spring support advantageously permit an increase in the spring prestressing precision. The flow direction, which has been changed in relation to the conventional solenoid valve makes it advantageously possible for the solenoid valve to be kept closed at the required pressures, even with a slight magnetic force since the flow direction according to the present invention permits a pressure-assisted closing motion of the armature with the sealing pin. In summary, the arrangement according to the present invention makes it possible for the individual components of the solenoid valve according to the present invention to be advantageously optimized so as to permit the greatest possible volumetric flow through the solenoid valve. It is thus possible, for example, for the effective hydraulic area of the solenoid valve according to the present invention to be enlarged in comparison to a conventional solenoid valve through an enlargement of the through flow bore and the sealing seat of the valve body; the sealing region on the sealing pin can be adapted to the enlarged sealing seat. Consequently, when open, the solenoid valve according to present invention—for example when used in a brake system—can permit a relatively high flow rate of brake fluid.

Advantageous improvements of the solenoid valve disclosed. It is particularly advantageous that the spring support is press-fitted into the valve insert; a prestressing of the return spring can advantageously be set individually during manufacture of the solenoid valve by adjusting the depth to which the spring support is press-fitted into the valve insert. After being press-fitted into place, the spring support holds the return spring in a position that corresponds to a certain predetermined force action, which advantageously permits an increase in the spring prestressing precision.

In one embodiment of the solenoid valve according to the present invention, the valve inlet is situated in the vicinity of a sleeve that has at least one through flow opening that is embodied, for example, in the form of an oblong hole and is situated between the valve insert and the valve body. The sleeve is permanently attached to the valve insert and valve body, for example by means of a laser welding procedure. Inside the sleeve, an annular filter can be provided, which protects the solenoid valve from contamination during operation and is slid at least partway onto the spring support.

In another embodiment of the solenoid valve according to the present invention, an outer contour of the spring support can cooperate with a correspondingly embodied inner contour of the annular filter in order to connect the annular filter to the spring support in a rotationally fixed fashion. For example, the outer contour of the spring support has an essentially triangular form, which extends partway into the annular filter in the region of the inner contour. The cooperation of the outer contour of the spring support and the corresponding inner contour of the annular filter advantageously prevents a rotation of the filter around the vertical axis through a form-locking engagement.

Alternatively, the spring support and the return spring can be embodied as integrally joined to each other, i.e. after the return spring, for example, the spring support is also wound from the same spring wire as the return spring and its individual coils are wound so that they rest directly against one another so as to inhibit the spring action. For being press-fitted into the valve insert, the coils of the spring support have a larger outer diameter than the coils of the return spring. In addition, the spring support has a retaining extension onto which the annular filter is slid and which cooperates with the annular filter so that the annular filter is attached to the spring support in a rotationally fixed fashion.

In another embodiment of the solenoid valve according to present invention, the annular filter has ventilation openings for ventilation of an armature chamber, i.e. an intermediate chamber between the armature and valve insert. In addition, the valve body can have a seal, for example an O-ring seal, situated on it so as to prevent a bypassing of the closed sealing seat and therefore of the solenoid valve in the fluid circuit.

Advantageous embodiments of the present invention described below and the conventional exemplary embodiment explained above for better comprehension are depicted in the drawings. Components and elements that have the same or analogous functions have been labeled with the same reference numerals in the drawings.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
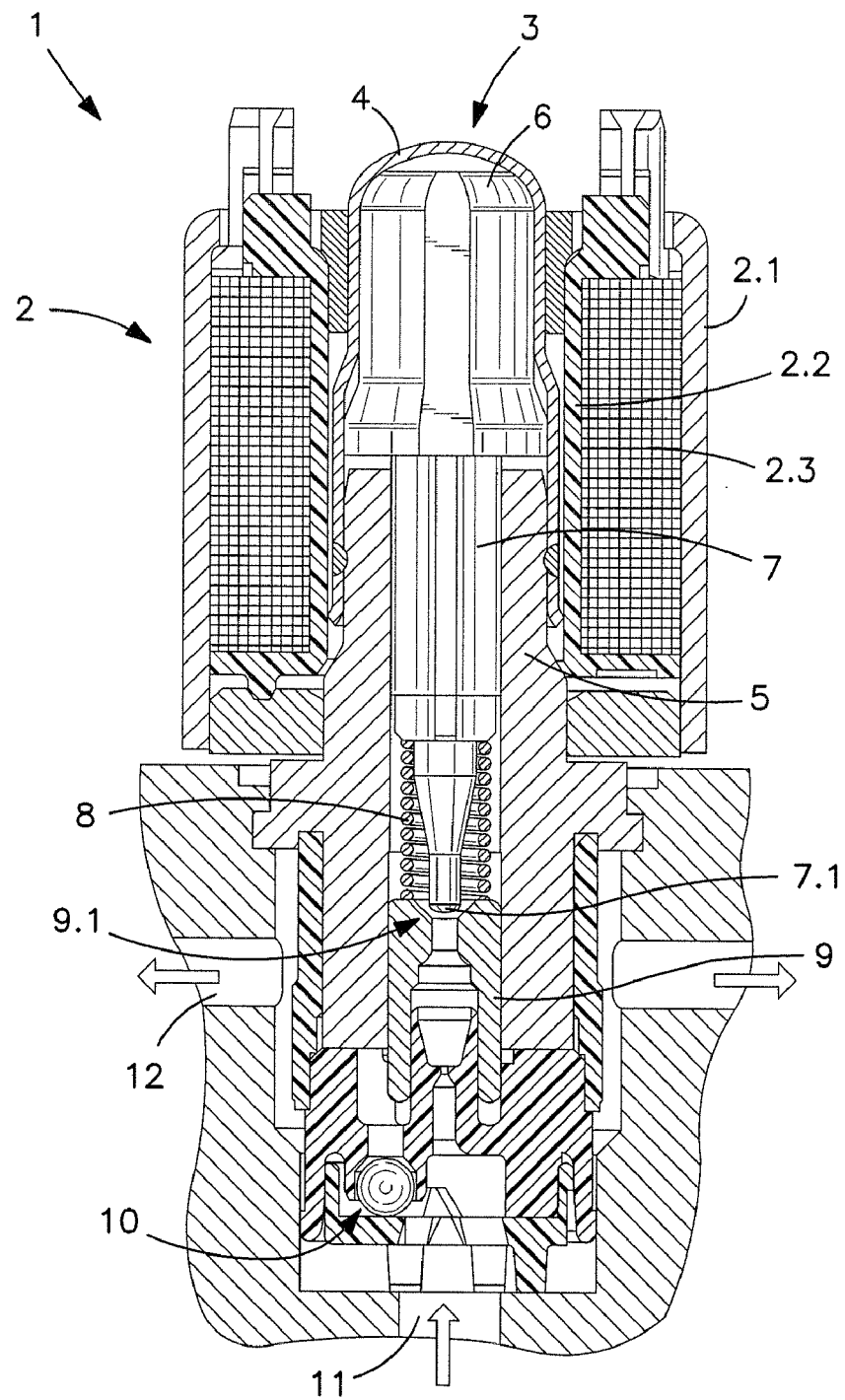
FIG. 1 is a schematic sectional depiction of a conventional solenoid valve, which is open when without current and has a check valve integrated into it.
Figure 2:
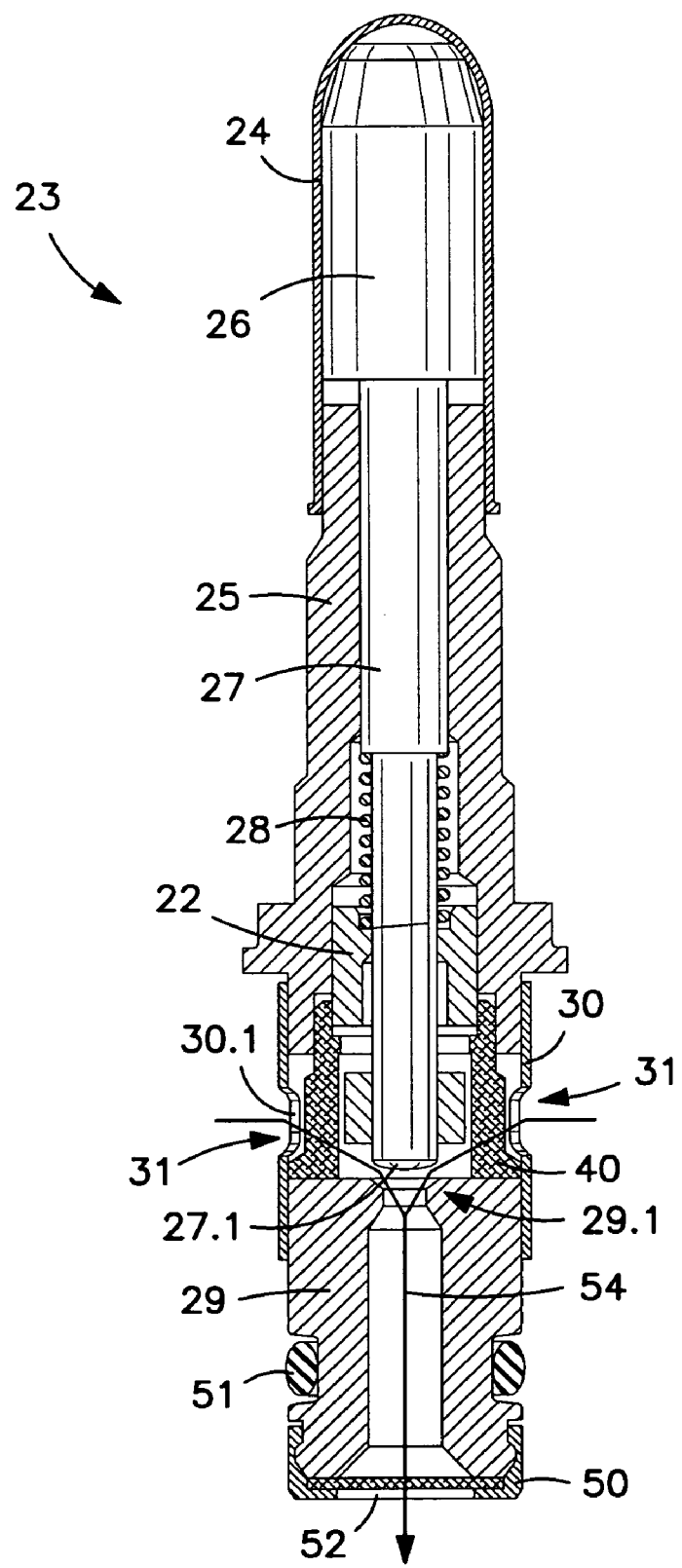
FIG. 2 is a schematic sectional depiction of a valve cartridge of a solenoid valve according to the present invention.

A solenoid valve according to present invention essentially includes a magnet unit, which can be embodied analogously to the conventional magnet unit 2 depicted in FIG. 1, and a valve cartridge 23 shown in FIG. 2 onto which the magnet unit can be slid. As is clear from FIG. 2, the valve cartridge 23 of the solenoid valve has a capsule 24, an armature 26 that is guided in the capsule 24 in a longitudinally mobile fashion and is connected to a sealing pin 27 that is guided inside a valve insert 25 in a longitudinally mobile fashion and a valve body 29 with a sealing seat 29.1. A magnetic force generated by the magnet unit, not shown, moves the armature 26 with the sealing pin 27 from an initial position toward the valve body 29 counter to the force of a return spring 28, causing the sealing pin 27, which has a sealing region 27.1 embodied, for example, in the form of a spherical dome, to move into the sealing seat 29.1 and completely close the sealing seat 29.1 in an end position. In the depicted initial position of the valve cartridge 23, a maximum volumetric flow 54 occurs between a valve inlet 31 and a valve outlet 52.

Since the solenoid valve according to the present invention is adapted to a brake system, for example, which requires a relatively high flow rate of brake fluid, the solenoid valve can provide a relatively high flow rate or volumetric flow 54 in comparison to the conventional solenoid valve 1 according to FIG. 1. In the solenoid valve according to the present invention, the higher volumetric flow 54 is achieved, for example, by the fact that a flow bore and the sealing seat 29.1 in the valve body 29 are enlarged and the sealing region 27.1 on the sealing pin 27 is adapted to the enlarged sealing seat 29.1. Because of the resulting larger effective hydraulic area, however, a greater magnetic force is required in order to keep the valve closed at the required pressures. In order to nevertheless be able to operate the solenoid valve with a reduced magnetic force, according to the present invention, the direction of the volumetric flow 54 has been changed in comparison to the conventional solenoid valve 1 in FIG. 1 in order to advantageously use the volumetric flow 54 to assist the closing movement of the armature 26 with the sealing pin 27 so that the valve can close in a pressure-assisted fashion. This novel flow direction, however, can cause the solenoid valve to inadvertently close automatically at high flow speeds. In order to prevent this, the valve stroke, the sealing seat 29.1, and the spring prestressing force are embodied in a correspondingly optimized fashion. In addition, a spring support 22 is provided, which is embodied and situated so that the return spring 28 is supported outside the volumetric flow 54 and presses the armature 26 into the initial position against the capsule 24. The placement of the return spring 28 outside the volumetric flow 54 advantageously prevents it from negatively influencing the volumetric flow 54. The spring support 22 is press-fitted into the valve insert 25 for example; the prestressing of the return spring 28 is individually set by means of the depth to which the spring support 22 is press-fitted into the valve insert 25 during the manufacture of the solenoid valve. This geometric arrangement advantageously makes it possible to increase the precision with which the spring prestressing is set. Consequently, after being press-fitted into the valve insert 25, the spring support 22 holds the return spring 28 in a position that corresponds to a certain predetermined force action.

As is also clear from FIG. 2, the valve inlet 31 is situated in the vicinity of a sleeve 30 that has a number of through flow openings 30.1 embodied in the form of oblong holes and is situated between the valve insert 25 and the valve body 29; the sleeve 30 is permanently attached to the valve insert 25 and the valve body 29, for example by means of laser welding. Inside the sleeve 30, there is an annular filter 40 that is slid at least partway onto the spring support 22.

Figure 3:
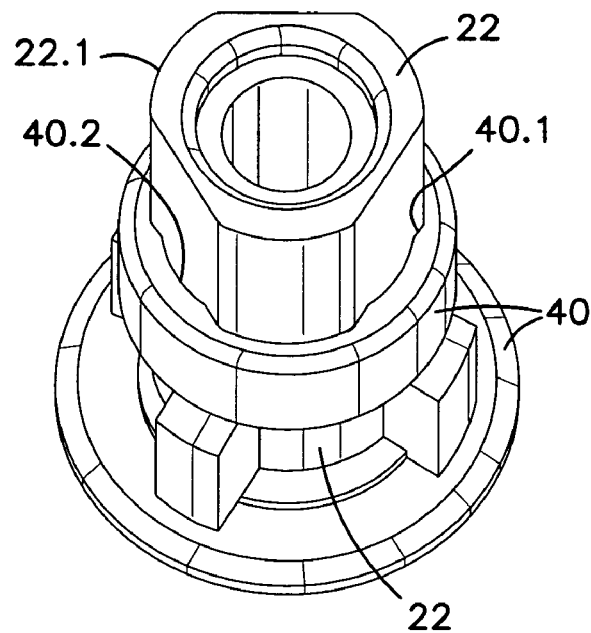
FIG. 3 is a detailed perspective depiction of an annular filter/spring support combination of the valve cartridge from FIG. 2.
Figure 4:
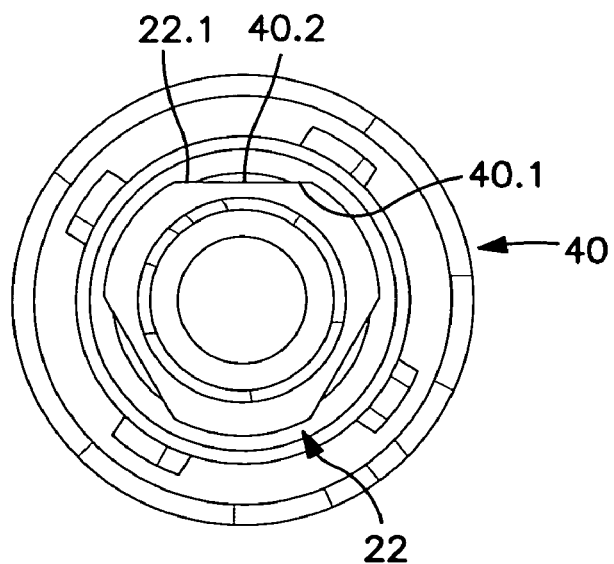
FIG. 4 is a top view of the annular filter/spring support combination from FIG. 3.

FIGS. 3 and 4 each show a detailed depiction of the annular filter/spring support combination of the valve cartridge 23 from FIG. 2. As is clear from FIGS. 3 and 4, an outer contour 22.1 of the spring support 22, which is essentially triangular, cooperates with an inner contour 40.1 of the annular filter 40 so that the annular filter 40 is connected to the spring support 22 in a rotationally fixed fashion and it is thus possible to prevent the annular filter 40 from rotating around the vertical axis. Consequently, in addition to positioning the return spring 28, the spring support 22 also performs the additional function of preventing the rotation of the annular filter 40 around the vertical axis. As is also clear from FIG. 4, the annular filter 40 is provided with ventilation openings 40.2 for ventilating an armature chamber situated between the armature 26 and the valve insert 25.

Figure 5:
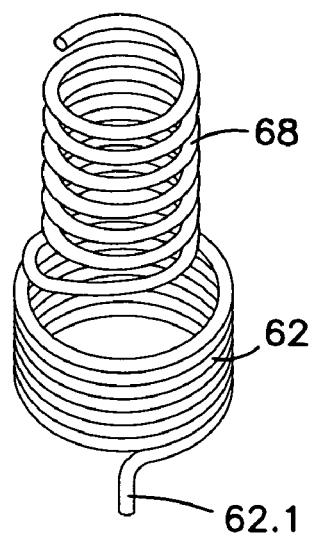
FIG. 5 is a perspective depiction of an annular filter/spring support combination for a solenoid valve according to the present invention.
Figure 6:
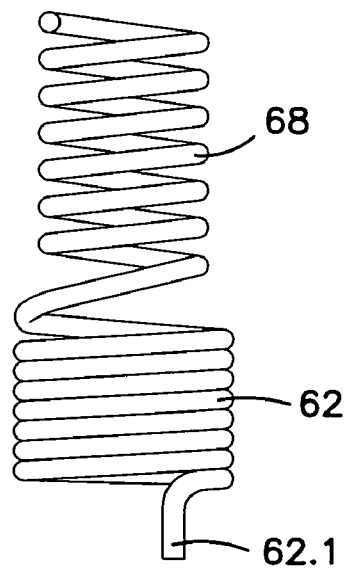
FIG. 6 is a front view of the annular filter/spring support combination from FIG. 5.

FIGS. 5 and 6 each show an alternative embodiment of the spring support 62 and return spring 68. As is clear from FIGS. 5 and 6, the spring support 62 and the return spring 68 are integrally joined to each other; the spring support 62 has a larger outer diameter than the return spring 68. After the return spring 68, for example, the spring support 62 can be wound from the same spring wire as the return spring 68. By contrast with the return spring 68, though, the individual coils of the spring support 62 are wound so that they rest directly against one another so as to inhibit the spring action. Analogous to the spring support 22 according to FIGS. 2 through 4, the spring support 62 according to FIGS. 5 and 6 is likewise press-fitted into the valve insert 25; the depth to which it is press-fitted into the valve insert 25 determines the prestressing of the return spring 68. As is also clear from FIGS. 5 and 6, the spring support 62 has a retaining extension 62.1 onto which an annular filter is slid and which cooperates with the annular filter so that the annular filter is attached to the spring support 62 in a rotationally fixed fashion.

The function of the solenoid valve according to the present invention will be explained below in conjunction with a brake system. The solenoid valve is open during normal braking operation, i.e. in the initial state, and therefore allows brake fluid to flow unhindered from the valve inlet 31 to the valve outlet 52. In it, the return spring 28, which is supported on the spring support 22, presses the sealing pin 27 and armature 26 upward against the capsule 24, which is permanently joined, e.g. welded, to the valve insert 25 and consequently determines the end stop for the two components 27, 26. This also determines the total stroke of the solenoid valve. The valve body 29 is connected to the valve insert 25 via the sleeve 30, thus forming a structural unit. The sleeve 30, which has a plurality of oblong holes 30.1 on its circumference, accommodates the annular filter 40, which protects the valve interior from becoming contaminated by the volumetric flow 54. A flat filter 50 clipped onto the valve body 29 likewise protects the valve interior from becoming contaminated by refluxes of brake fluid. With its outer contour 22.1, which is triangular, the spring support 22 protrudes partway into the annular filter 40, which has an inner contour 40.1 that corresponds to the outer contour 22.1 of the spring support 22 and prevents the annular filter 40 from rotating around the vertical axis at high flow speeds. In order to be able to better ventilate the armature chamber in all possible installation positions in the valve, the annular filter also has the above-mentioned ventilation openings 40.2.

If the brake system fails for whatever reason and goes into fallback mode, then a magnet unit is supplied with current, thus exciting the armature 26 that presses the sealing pin 27 with the sealing surface 27.1 down into the sealing seat 29.1 of the valve body 29 counter to the spring force of the return spring 28 and consequently closes the solenoid valve. The brake pedal pressure exerted is now obstructed; a seal 51 preferably embodied as an O-ring prevents a bypassing of the closed sealing seat 29.1 and therefore of the solenoid valve in the fluid circuit. This results in a desirably firm pedal action.

The foregoing relates to preferred exemplary embodiments of the invention, it being understood that other variants and embodiments thereof are possible within the spirit and scope of the invention, the latter being defined by the appended claims.

We claim:

1. In a solenoid valve having a magnet unit and a valve cartridge that has a capsule, an armature that is guided in the capsule in a longitudinally mobile fashion and connected to a sealing pin guided inside a valve insert in a longitudinally mobile fashion, and a valve body with a sealing seat; a magnetic force generated by the magnet unit moves the armature together with the sealing pin from an initial position toward the valve body counter to the force of a return spring, causing a sealing region of the sealing pin to move into the sealing seat and close the sealing seat completely in an end position, where the initial position represents a maximum volumetric flow between a valve inlet and a valve outlet, the improvement comprising a spring support embodied and situated so that the return spring is supported outside the volumetric flow and presses the armature into the initial position against the capsule, a sleeve having at least one through flow opening situated between the valve insert and valve body, and an annular filter situated inside the sleeve and slid at least partway onto the spring support, wherein the valve inlet and valve outlet are embodied and situated so that the direction of the volumetric flow assists the closing motion of the armature with the sealing pin, and the valve inlet is situated in the vicinity of the sleeve and the sleeve is permanently joined to the valve insert and the valve body.

2. The solenoid valve as recited in claim 1, wherein the spring support is press-fitted into the valve insert whereby it is possible to set a prestressing of the return spring by means of the depth to which the spring support is press-fitted into the valve insert.

3. The solenoid valve as recited in claim 1, wherein an outer contour of the spring support cooperates with an inner contour of the annular filter so that the annular filter is connected to the spring support in a rotationally fixed fashion by means of a form-locked engagement.

4. The solenoid valve as recited in claim 2, wherein an outer contour of the spring support cooperates with an inner contour of the annular filter so that the annular filter is connected to the spring support in a rotationally fixed fashion by means of a form-locked engagement.

5. The solenoid valve as recited in claim 3, wherein the outer contour of the spring support has an essentially triangular form.

6. The solenoid valve as recited in claim 4, wherein the outer contour of the spring support has an essentially triangular form.

7. The solenoid valve as recited in claim 1, wherein the spring support and return spring are integrally joined, and wherein the spring support has a larger outer diameter than the return spring.

8. The solenoid valve as recited in claim 2, wherein the spring support and return spring are integrally joined, and wherein the spring support has a larger outer diameter than the return spring.

9. The solenoid valve as recited in claim 3, wherein the spring support and return spring are integrally joined, and wherein the spring support has a larger outer diameter than the return spring.

10. The solenoid valve as recited in claim 4, wherein the spring support and return spring are integrally joined, and wherein the spring support has a larger outer diameter than the return spring.

11. The solenoid valve as recited in claim 7, wherein the spring support further comprises a retaining extension that cooperates with the annular filter so that the annular filter is attached to the spring support in a rotationally fixed fashion.

12. The solenoid valve as recited in claim 10, wherein the spring support further comprises a retaining extension that cooperates with the annular filter so that the annular filter is attached to the spring support in a rotationally fixed fashion.

13. The solenoid valve as recited in claim 1, wherein the annular filter comprises ventilation openings for ventilating an armature chamber.

14. The solenoid valve as recited in claim 3, wherein the annular filter comprises ventilation openings for ventilating an armature chamber.

15. The solenoid valve as recited in claim 5, wherein the annular filter comprises ventilation openings for ventilating an armature chamber.

16. The solenoid valve as recited in claim 1, further comprising a seal which is situated so as to prevent a bypassing of the closed sealing seat.

17. The solenoid valve as recited in claim 16, wherein the seal is an O-ring seal.

18. The solenoid valve as recited in claim 7, wherein the return spring is wound from wire and the spring support is wound from the same wire as the return spring.

19. The solenoid valve as recited in claim 8, wherein the return spring is wound from wire and the spring support is wound from the same wire as the return spring.

20. The solenoid valve as recited in claim 7, wherein individual coils of the spring support, in contrast to individual coils of the return spring, are wound so that the coils rest directly against one another so as to inhibit spring action.

* * * * *